United States Patent
Cox

[19]

[11] Patent Number: 6,091,572
[45] Date of Patent: Jul. 18, 2000

[54] CONNECTOR CONTACT ASSEMBLY WITH HIGH NORMAL FORCE COMPRESSION

[75] Inventor: Alvin Eugene Cox, Yukon, Okla.

[73] Assignee: Seagate Technology, Inc., Scotts Valley, Calif.

[21] Appl. No.: 09/016,746

[22] Filed: Jan. 30, 1998

Related U.S. Application Data

[60] Provisional application No. 60/062,167, Oct. 16, 1997.

[51] Int. Cl.[7] .................................................. G11B 17/02
[52] U.S. Cl. ......................................................... 360/99.08
[58] Field of Search .............................. 360/97.01, 99.08, 360/99.09, 99.11; 439/80, 82, 851, 884, 894

[56] References Cited

U.S. PATENT DOCUMENTS

| | | | |
|---|---|---|---|
| 4,679,890 | 7/1987 | Fineblum | 439/884 |
| 5,083,927 | 1/1992 | Herard et al. | 439/80 |
| 5,154,621 | 10/1992 | Legrady | 439/82 |
| 5,631,999 | 5/1997 | Dinsmore et al. | |
| 5,705,868 | 1/1998 | Cox et al. | |

*Primary Examiner*—David Davis
*Attorney, Agent, or Firm*—Crowe & Dunlevy

[57] ABSTRACT

A connector contact assembly for receiving insertion of a corresponding connector pin to establish an interconnected electrically conductive path is disclosed suitable for use, for example, to provide drive current to a spindle motor of a disc drive. The connector contact assembly comprises a rigid, nonconductive housing and an electrically conductive contact which pressingly engages the connector pin when the connector pin is inserted along a pin insertion axis. The contact comprises a contact base rigidly secured to a first surface of the housing, a central flexure extending from the contact base along a curvilinear path apart from the first surface, and a distal end rigidly secured to a second surface of the housing. When the connector pin is inserted, the central flexure is deflected toward the first surface, with the second surface limiting movement of the distal end in a direction parallel to the pin insertion axis.

12 Claims, 7 Drawing Sheets

CONNECTOR CONTACT ASSEMBLY WITH HIGH NORMAL FORCE COMPRESSION

RELATED APPLICATIONS

This application claims the benefit of U.S. Provisional Application Ser. No. 60/062,167 entitled HIGH NORMAL FORCE COMPRESSION CONNECTOR CONTACT, filed Oct. 16, 1997, assigned to the assignee of the present invention.

FIELD OF THE INVENTION

The present invention relates generally to electronic connectors and more particularly, but without limitation, to an electrical connector contact assembly that provides a high normal force suitable for use in relatively high current applications, such as for example, a spindle motor of a disc drive storage device.

BACKGROUND

Electrical connectors are commonly used to establish mechanical and electrical interconnections in modern electronic devices. Such connectors typically comprise a male connector portion having a rigid, fixed pin which interconnects with a corresponding female connector portion having a spring-biased, moveable contact. Such connectors may include a single pin/contact pair, but more typically comprise several (or even several tens of) pin/contact pairs.

Of the multitude of electrical connectors presently in use, one well known variety relates to signal interconnection, whereby data in the form of analog or digital voltages and corresponding currents are transferred from one electronic device to another. Another well known variety of electrical connectors relates to power delivery, whereby voltage and current are applied from a source device to a load device by way of the electrical connector.

It will be recognized that reliable interconnection between pins and contacts of a connector is necessary to ensure proper operation of an electrical device relying upon signals or power transmitted through the connector. In the field of disc drives, for example, the advent of personal computers has caused the migration of such devices out of carefully controlled, isolated computer-room environments to the "real-world" of home and office where mechanical shocks, vibration and large temperature variations are frequently encountered. Owners of portable computers are likely to take and operate their computers in a wide variety of environments and thus require ever increasing levels of reliability from their machines. As disc drives typically include a number of both power and signal connectors, it is crucial that all such connectors retain solid interconnections in view of such environmental and mechanical conditions to ensure reliable operation of the drives.

A connector contact typically includes a conductive portion that is fashioned so that a solid mechanical connection is established when the associated connector pin is brought to bear thereagainst when the connector pair is mated. It is common to form at least a portion of the contact as a spring so that the conductive portion of the contact is forced against the pin. However, it has been found difficult in many instances to adequately control and maintain this contact force at a desirable level. If too much contact force is provided, the pins or the contacts can be physically damaged when the pin is inserted; conversely, if insufficient contact force is provided, the connector may subsequently exhibit intermittent mechanical and electrical interconnection, adversely affecting the operation of the associated electronic device.

Moreover, both contacts and pins are often relatively easy to bend or deform, especially when the pins are improperly inserted or after the connector has been mated and unmated a number of times. Thus, while connector reliability is crucial to facilitate reliable device operation, it is often difficult to ensure that adequate contact force has been established and will be subsequently maintained during device operation.

Accordingly, as users become increasingly dependent upon the availability of their electronic devices, improvements in the art are continually needed to ensure that reliable interconnections are maintained within such devices.

SUMMARY OF THE INVENTION

The present invention is directed to an improved connector contact assembly for use in the interconnection of electronic devices.

In accordance with a preferred embodiment, the contact assembly is utilized to provide current to a spindle motor of a disc drive storage device by engaging a corresponding connector pin of the spindle motor. The contact assembly comprises a rigid, nonconductive housing having a first surface substantially parallel to a pin insertion axis along which the connector pin is inserted, and an electrically conductive contact adjacent the housing which pressingly engages the connector pin when the connector pin is inserted.

The contact preferably comprises a contact base which is rigidly affixed adjacent the first surface, a central flexure which extends from the contact base along a curvilinear path at a selected distance from the surface, and a distal end which is affixed relative to a second surface of the housing, the second surface preferably extending in a direction substantially normal to the pin insertion axis.

The second surface limits movement of the distal end of the contact when the connector pin is inserted, causing the central flexure of the contact to be deflected in a direction toward the first surface as the pin is brought to bear thereagainst. Hence, the contact base and the distal end are captured, preventing damage to the contact during handling. Moreover, a readily controllable contact force is exerted by the central flexure upon the connector pin during and after insertion.

These and various other features as well as advantages which characterize the present invention will be apparent from a reading of the following detailed description and a review of the associated drawings.

DETAILED DESCRIPTION

Figure 1:
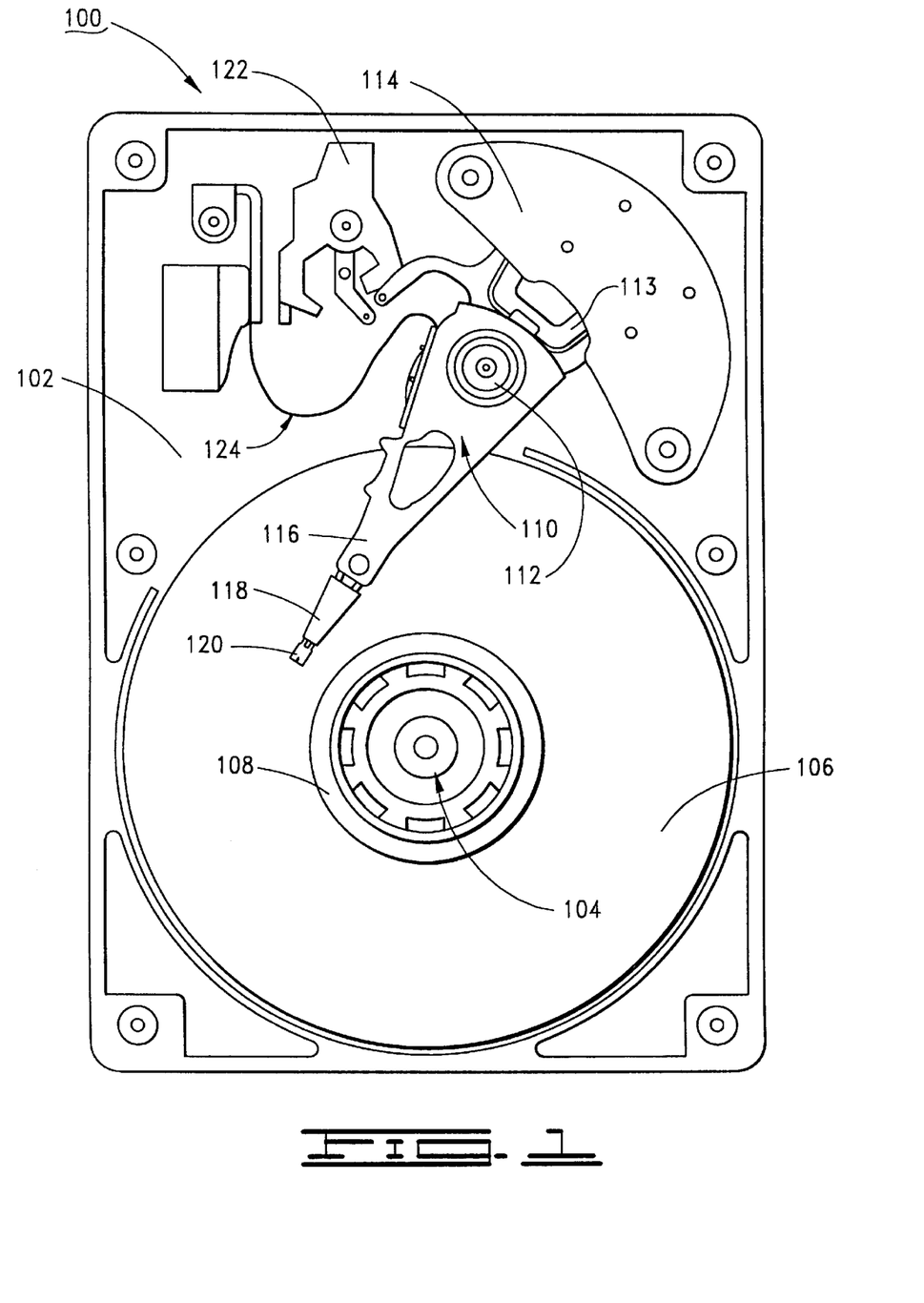
FIG. 1 provides a top plan view of a disc drive constructed in accordance with a preferred embodiment of the present invention.

For purposes of disclosing a preferred embodiment in which particular features and advantages of the present invention can be discussed, FIG. 1 provides a top plan view of disc drive, which has been generally identified therein at 100.

The disc drive 100 includes a base deck 102 on which various disc drive components are mounted. A top cover, which has been omitted from FIG. 1 to facilitate the present discussion, cooperates with the base deck 102 to form an internal, sealed environment for the disc drive 100.

Of particular interest is a spindle motor 104, the interconnection of which is accomplished in accordance with a preferred embodiment of the present invention and will be discussed below in greater detail. Initially, however, it will be understood that the spindle motor 104 is provided in order to rotate a stack of axially aligned magnetic discs 106 at a constant high speed. A conventional disc clamp 108 is used to secure the discs 106 to the spindle motor 104.

Continuing with FIG. 1, remaining portions of the disc drive 100 include a controllably positionable actuator assembly 110 which rotates about a cartridge bearing assembly 112 in response to currents applied to a coil 113 of a voice coil motor 114. Actuator arms 116 extend from the actuator assembly 110 and are interposed adjacent the discs 106, with flexures 118 extending from distal ends of the actuator arms 116 as shown. Heads 120 used to transfer data to the discs 106 are suspended by the flexures 118. A latch 122 is used to secure the actuator assembly 110 when the disc drive 100 is non-operational and a flex circuit assembly 124 facilitates the transfer of data and power between the actuator assembly 110 and a disc drive printed wiring assembly (PWA) mounted to the underside of the disc drive 100 (the PWA is not shown in FIG. 1).

Figure 2:
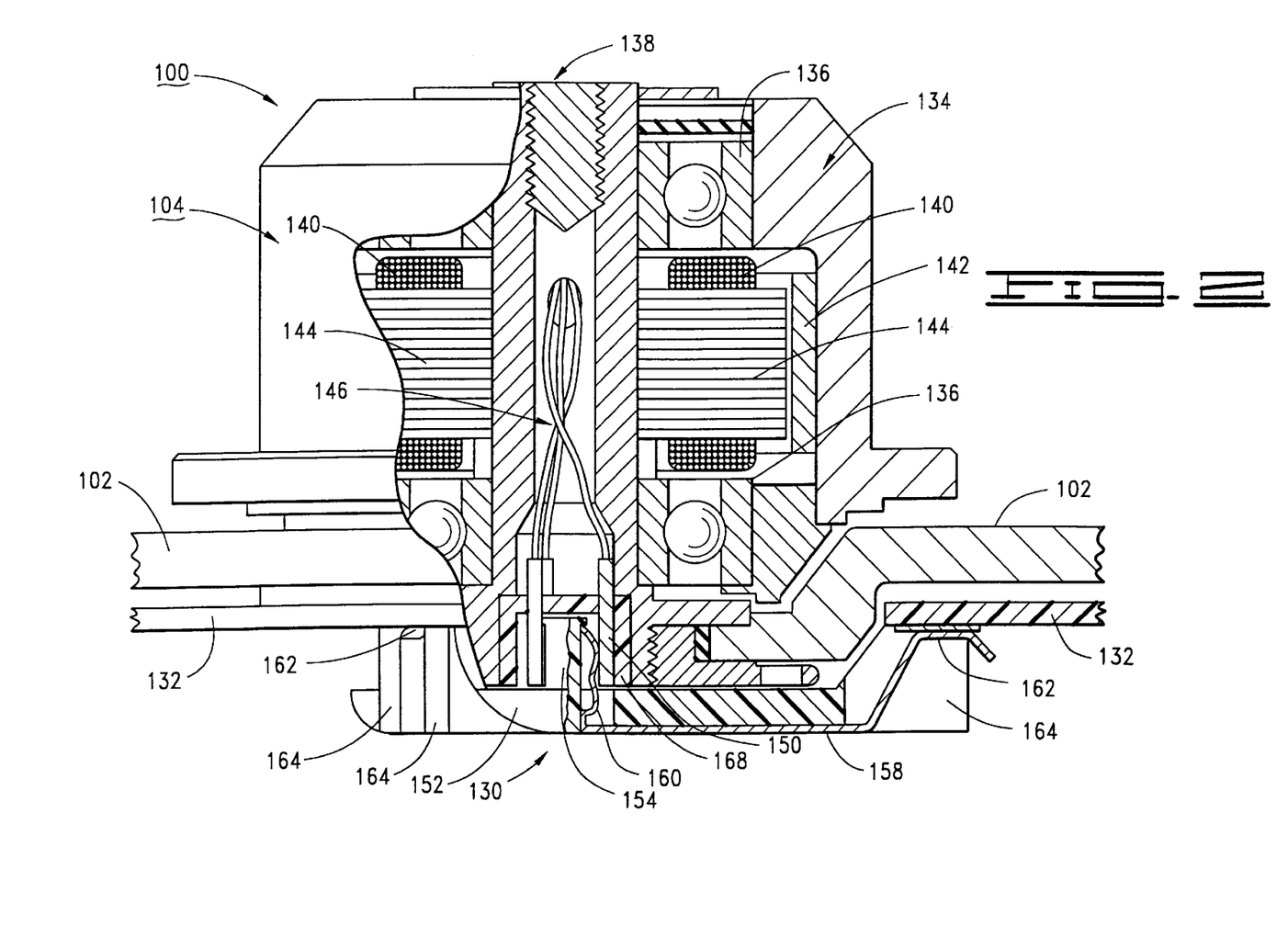
FIG. 2 provides an elevational, partial cross-sectional view of relevant portions of the disc drive of FIG. 1, including a spindle motor connector which houses three connector contact assemblies constructed in accordance with a preferred embodiment.

Referring now to FIG. 2, shown therein is a side elevational, partial cross-sectional view of relevant portions of the disc drive 100 of FIG. 1, including the spindle motor 104, which is mounted to the base deck 102 as shown. For clarity, the discs 106 and the disc clamp 108 of FIG. 1 have been omitted from FIG. 2.

Figure 3:
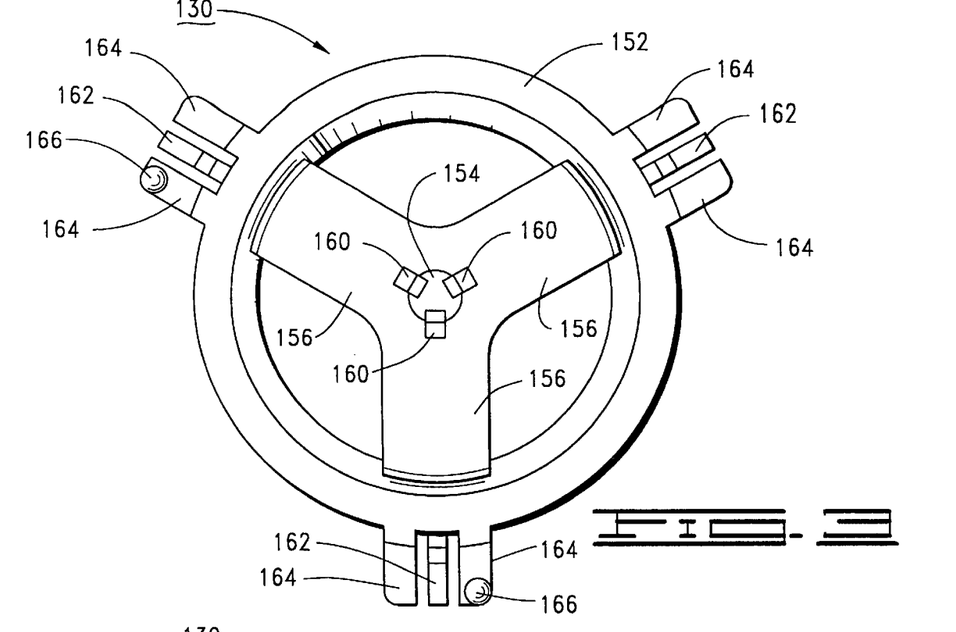
FIGS. 3 and 4 provide top and bottom plan views, respectively, of the spindle motor connector of FIG. 2.
Figure 4:
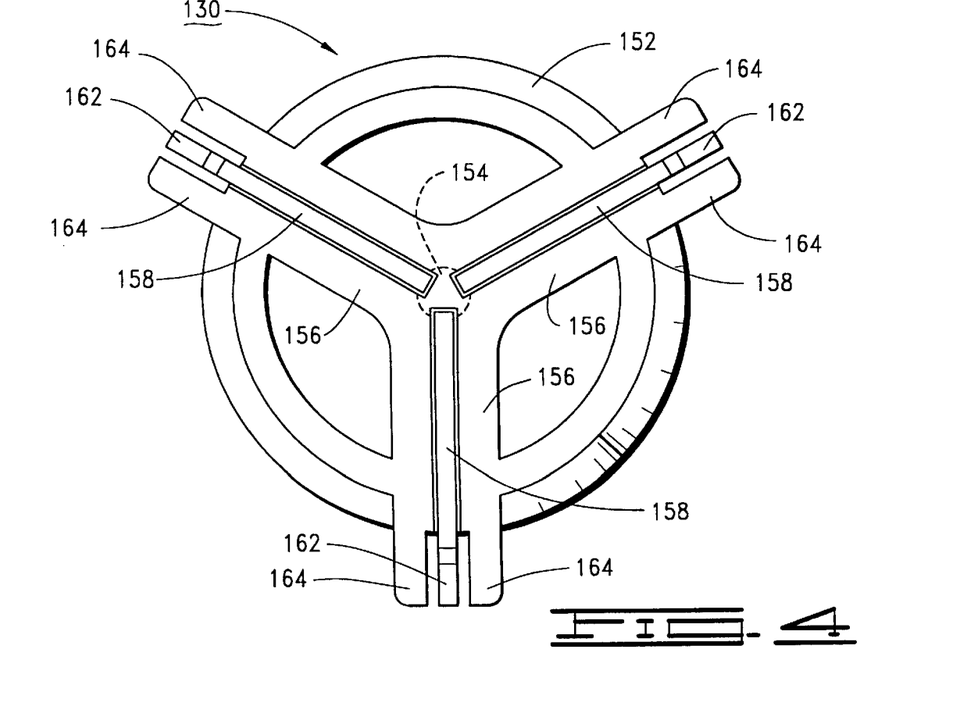

Additionally shown is a spindle motor connector 130, constructed in accordance with a preferred embodiment of the present invention. Top and bottom views of the spindle motor connector 130 are shown in FIGS. 3 and 4.

As shown in FIG. 2, the spindle motor connector 130 is mounted to the disc drive PWA (denoted at 132) and interconnects with the spindle motor 104 in order to facilitate the passage of drive current from the PWA 132 to the spindle motor 104. Before discussing the spindle motor connector 130 in detail, however, various features of the construction of the spindle motor 104 will first be briefly reviewed in order to facilitate the present discussion.

As is typical in the art, the spindle motor 104 includes a rotatable rotor housing 134 which rotates by way of ball bearing assemblies 136 about a stationary shaft assembly 138. A series of coils 140 mounted to the shaft assembly 138 magnetically interact with a series of permanent magnets 142 mounted to the rotor housing 134 in response to the application of current to the coils 140 during back electromagnetic force (bemf) commutation of the spindle motor 104 by spindle motor circuitry (not shown) on the PWA 132. For a discussion of typical spindle motor bemf commutation techniques, see U.S. Pat. No. 5,631,999 issued May 20, 1997 to Dinsmore, assigned to the assignee of the present invention.

The coils 140 are wrapped around laminated pole pieces 144 in a conventional manner. Coil wires 146 are routed from the coils 140 down a central opening (not designated) in the shaft assembly 138 to three connector pins 150, which are inserted into the spindle motor connector 130.

With reference to FIGS. 3 and 4, the spindle motor connector 130 is provided with an outer ring 152 which supports a central housing 154 by way of three spoke arms 156, all of which are fabricated from insulative plastic. The central housing 154 extends upwardly from the spoke arms 156 for receipt into the shaft assembly 138, as shown more clearly in FIG. 2. Electrical leads 158 are supported by the spoke arms 156 and terminate at connector contact assemblies 160 (also referred to as "contact assemblies") which cooperate with the aforementioned pins 150 of the spindle motor 104 to establish electrical interconnections between the PWA 132 and the spindle motor 104. Ends 162 of the electrical leads 158 opposite the contact assemblies 160 are soldered to the PWA 132 and serve to secure the spindle motor connector 130 to the PWA 132.

Support arms 164 are disposed adjacent the ends 162 and pin features 166 are additionally provided, as desired, to further assist in properly orienting the spindle motor connector 130 on the PWA 132. For additional discussion regarding general features of the spindle motor connector 130, see U.S. Pat. No. 5,750,868 issued Jan. 6, 1998 to Cox et al., assigned to the assignee of the present invention.

Figure 5:
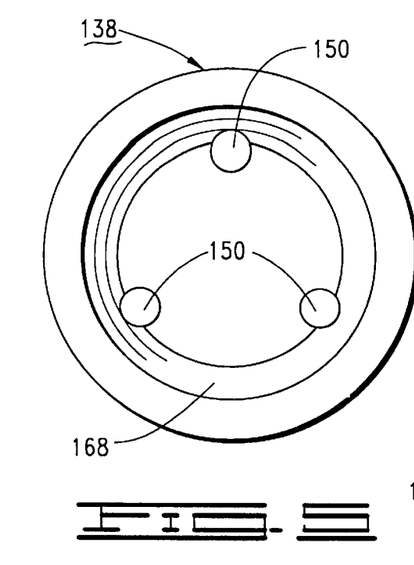
FIG. 5 provides a plan view of a shaft of the spindle motor of FIG. 2, illustrating the general orientation of three corresponding connector pins which are inserted into the connector contact assemblies of the spindle motor connector.

Finally, it will be noted that the pins 150 extending from the shaft 138 of the spindle motor 104 are supported by an insulative plug 168, the plug 168 further serving to seal interior portions of the spindle motor 104. The pins 150 are located at positions closely adjacent an inside surface (not designated) of the shaft assembly 138, as shown in FIG. 5; hence, the central housing 154 does not extend completely around the connector contact assemblies 160 of the spindle motor connector 130.

Figure 6:
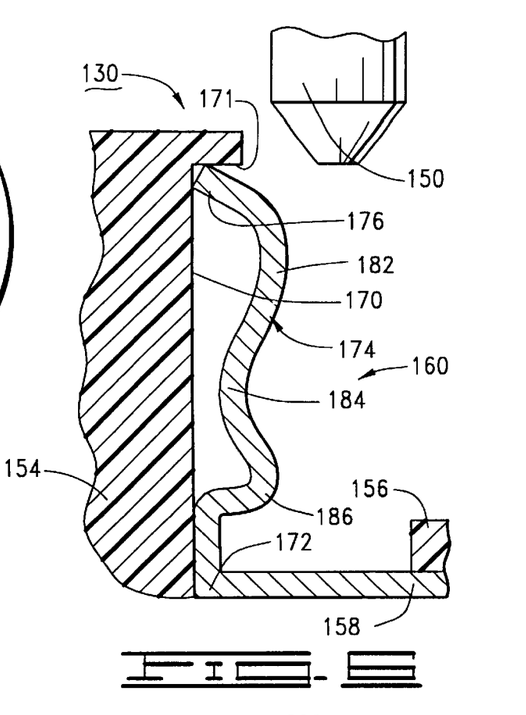
FIG. 6 provides an elevational, cross-sectional view of a selected one of the connector contact assemblies in conjunction with the corresponding connector pin in an uninserted state.

Having now discussed the general construction of the spindle motor 104 and the spindle motor connector 130, attention is now directed to FIG. 6 which shows a selected one of the connector contact assemblies 160 of the spindle motor connector 130 in greater detail, the connector contact assembly 160 being constructed in accordance with a preferred embodiment of the present invention.

As shown in FIG. 6, the connector contact assembly 160 includes a first surface 170 of the central housing 154, the first surface 170 preferably extending in a direction that is substantially parallel to a pin insertion axis along which the connector pin 150 is inserted. A second surface 171 of the central housing 154 is shown to extend in a direction substantially toward the pin 150. As mentioned above, the central housing 154 is formed from a rigid, nonconductive material (such as injection molded plastic) so as to provide electrical insulation for the spindle motor connector 130.

The contact assembly 160 further comprises a contact base 172 which is rigidly secured to the first surface 170 of the contact housing 154. More particularly, the contact base 172 abuts the surface 170 and remains affixed thereto during (and after) insertion of the connector pin 150. This is because the contact base 172 is electrically connected to the associated electrical lead 158 (previously discussed with respect to FIGS. 3 and 4), which tends to retain the contact base 172 against the surface 170. Other methodologies including barbs can additionally be used to ensure the contact base 172 remains rigidly secured relative to the surface 170.

Attached to the contact base 172 is a central flexure 174 which extends from the contact base 172 along a curvilinear path away from the surface 170 and upward in a direction substantially toward the pin 150, as shown. A distal end 176 is placed adjacent the second surface 171, the second surface 171 limiting movement of the distal end 176 when the connector pin 150 is inserted.

Figure 7:
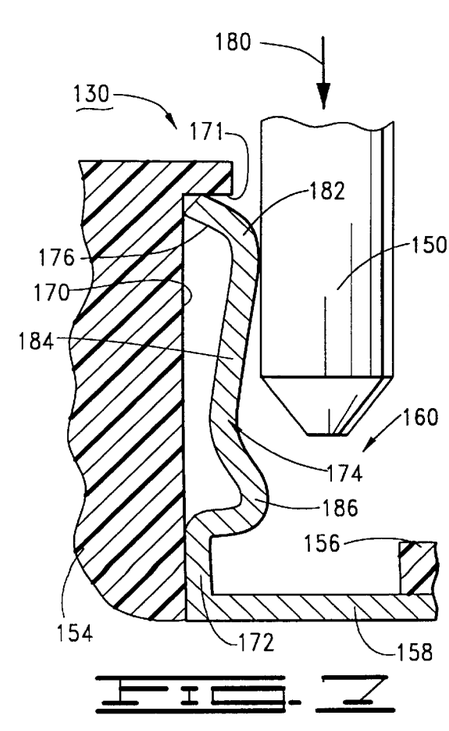
FIG. 7 shows the connector contact assembly of FIG. 6 in a mated state.

As shown in FIG. 7, insertion of the connector pin 150 into the contact assembly 160 causes the central flexure 174 to be deflected in a direction toward the surface 170. More particularly, because the contact base 172 and the distal end 176 are rigidly retained by the first and second surfaces 170, 171, respectively, the central flexure 174 is the only portion of the contact assembly 160 that is allowed to move in response to the insertion of the connector pin 150. Thus, as the central flexure 174 is deformed by insertion of the connector pin 150 along the pin insertion axis (as indicated by arrow 180), the central flexure 174 exerts a substantial normal force against the pin 150, thereby providing a reliable electrical interconnection between the connector pin 150 and the central flexure 174. Such a reliable interconnection is particularly desirable to accommodate the passage of currents as high as five to ten amps in peak magnitude, which are commonly provided to spindle motors such as shown at 104 during start-up.

Preferably, the central flexure 174 includes first, second and third curved sections which are denoted at 182, 184 and 186, respectively, with the first and third curved sections 182, 186 maintaining a generally convex orientation with respect to the pin insertion axis (along arrow 180) and the second curved section 184 maintaining a generally concave orientation with respect to the pin insertion axis. Accordingly, during insertion the connector pin 150, after moving past the distal end 176, initially contacts the first curved section 182 and deflects the first and second curved sections 182, 184 toward the first surface 170. The second curved section 184 may or may not actually contact the first surface 170, depending upon the configuration of the contact assembly 160, as discussed in greater detail below.

At this point it will be noted that the connector assembly 160 provides significant advantages over the prior art, in that the contact base 172 is immobilized by the first surface 170 and the distal end 176 is limited to rotational movement by the second surface 171. Because the contact base 172 and the distal end 176 are so fixed during (and after) insertion, the central flexure 174 is substantially the only portion of the contact assembly 160 which is allowed to move. This results in the exertion of a highly controllable normal force by the central flexure 174 against the connector pin 150 in accordance with the tensile strength and shape of the central flexure 174. Further, stresses in the central flexure 174 are distributed substantially over the length of the central flexure 174, unlike typical connectors of the prior art. Such advantages of the connector assembly 160 can be readily observed when viewed in contrast with a typical prior art contact assembly, such as shown at 190 in FIG. 8.

Figure 8:
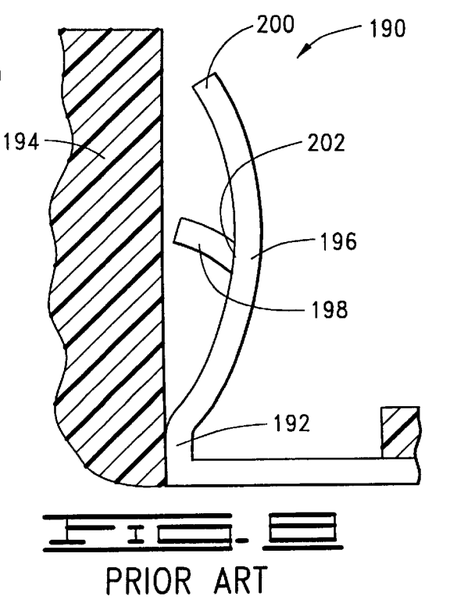
FIG. 8 provides an elevational partial cross-sectional view of a prior art connector contact assembly, provided for purposes of comparison with the connector contact assembly shown in FIGS. 6 and 7.

Turning to FIG. 8, the prior art contact assembly 190 is shown to include a contact base 192 placed against a housing 194, a contact spring 196 extending from the contact base 192 and a tab 198 extending from the contact spring 196 toward the housing 194. A distal end of the contact spring 196 is identified at 200 and is free to move with respect to the housing 194. Although not shown with particularity in FIG. 8, it will be understood that the tab 198 is contiguous with the contact spring 196 and bent forward therefrom as a result of an upside-down unshaped cut in the contact spring 196.

From FIG. 8 it will be recognized that as a connector pin (not shown) is inserted in a manner as discussed above, the contact spring 196 will be deflected toward the housing 194 so that the tab 198 will be compressed against the housing 194. The tab 198 serves to provide the primary normally directed contact force against the connector pin; thus, substantially all of the stress in the contact assembly 190 is concentrated at a point 202 at the base of the tab 198, providing a risk of failure at this point. Moreover, the distal end 200 is free to move relative to the housing 194, allowing the prior art contact assembly 190 to be deformed or damaged during incorrect or repeated insertion of the connector pin, or during handling of the contact assembly 190 in an unmated state.

Figure 9:
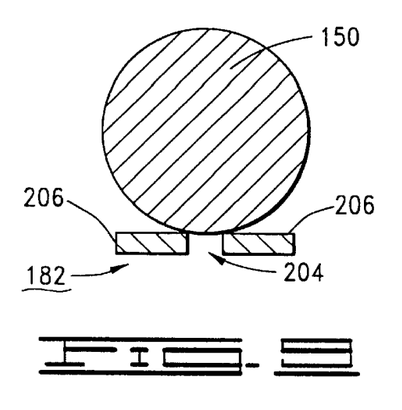
FIGS. 9 through 11 provide cross-sectional views of alternative constructions for a central flexure portion of the connector contact assembly shown in FIGS. 6 and 7.
Figure 10:
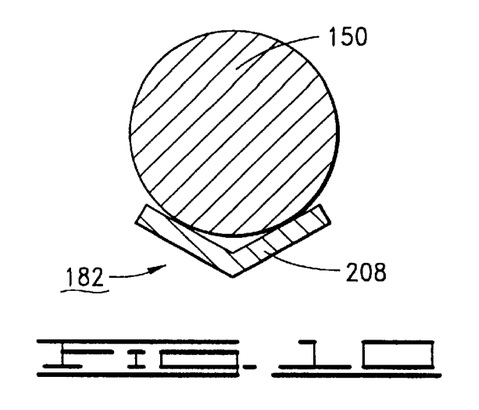
Figure 11:
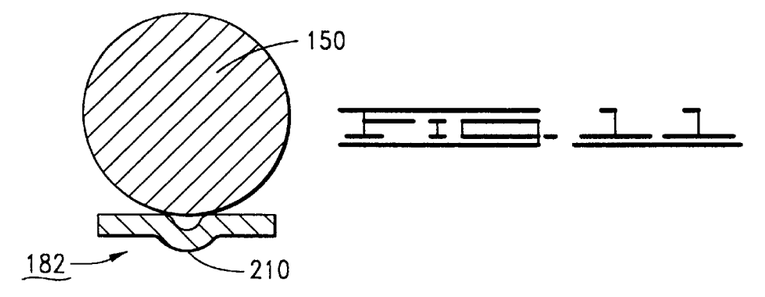

Referring now to FIGS. 9–11, shown therein are cross-sectional representations of alternative preferred embodiments for the first curved section 182 of the central flexure 174 shown in FIGS. 6 and 7, in conjunction with the connector pin 150. Although the first curved section 182 can be formed as a contiguous ribbon as discussed above, the first curved section can be alternatively provided with a central channel 204 (as shown in FIG. 9) so that two discrete portions 206 contact the connector pin 150. In another embodiment, as shown in FIG. 10 the first curved section 182 comprises a v-shaped portion 208 which contacts the connector pin 150. In yet another embodiment, as shown in FIG. 11 the first curved section 182 is provided with a dimple 210. It will be recognized that these alternative embodiments serve to provide improved interconnection between the first curved section 182 and the connector pin 150.

Figure 12:
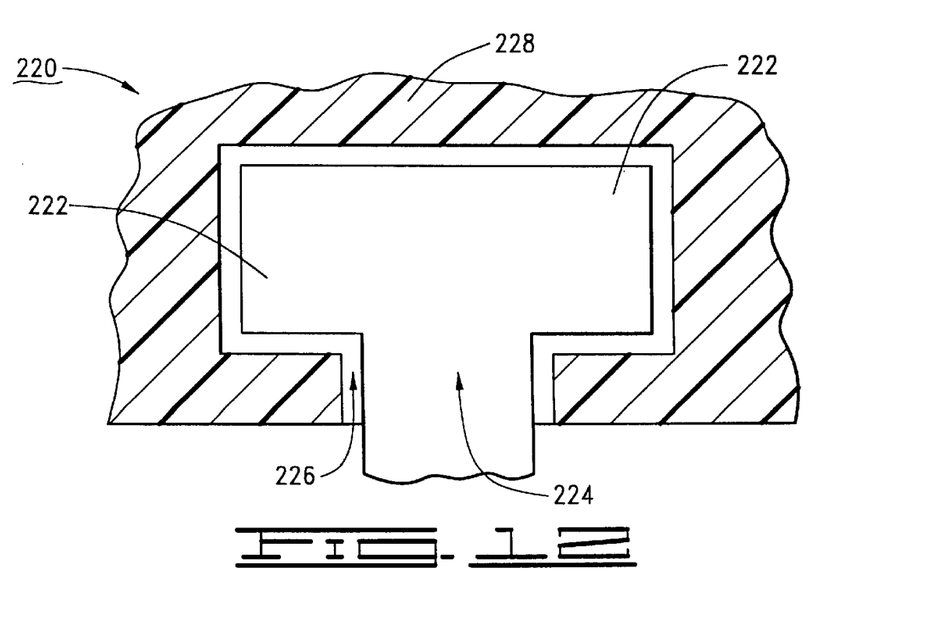
FIG. 12 provides a partial cross-sectional view of tabs of a distal end of an alternative connector contact assembly, the tabs locking into a corresponding retention slot in the connector housing in order to facilitate the immobilization of the distal end during insertion of the connector pin.

Turning now to FIG. 12, shown therein is a top plan, partial cross-sectional view of an alternative configuration for a connector contact assembly 220 generally similar to the contact assembly 160 discussed above, in order to illustrate another preferred embodiment of the present invention.

More particularly, FIG. 12 shows tabs 222 extending from a distal end 224 and locking into a t-shaped retention slot 226 extending through an associated, alternative connector housing 228.

Figure 13:
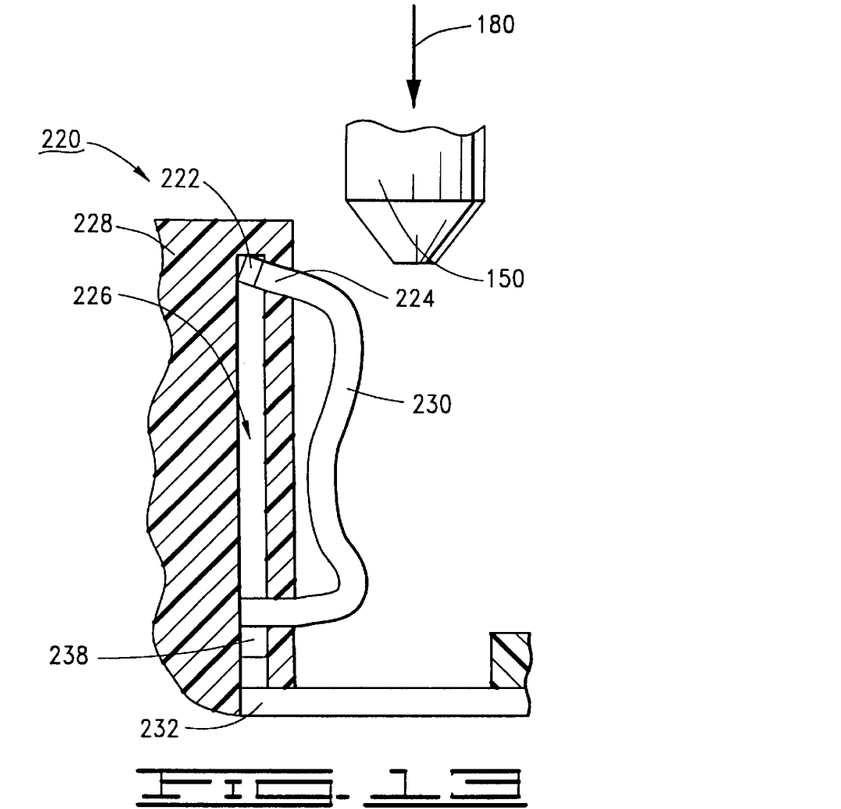
FIG. 13 provides an elevational, partial cross-sectional view of the connector contact assembly of FIG. 12, showing one of the tabs of the distal end of FIG. 12, as well as barbs of the contact base which serve to secure the contact base relative to the connector housing.
Figure 14:
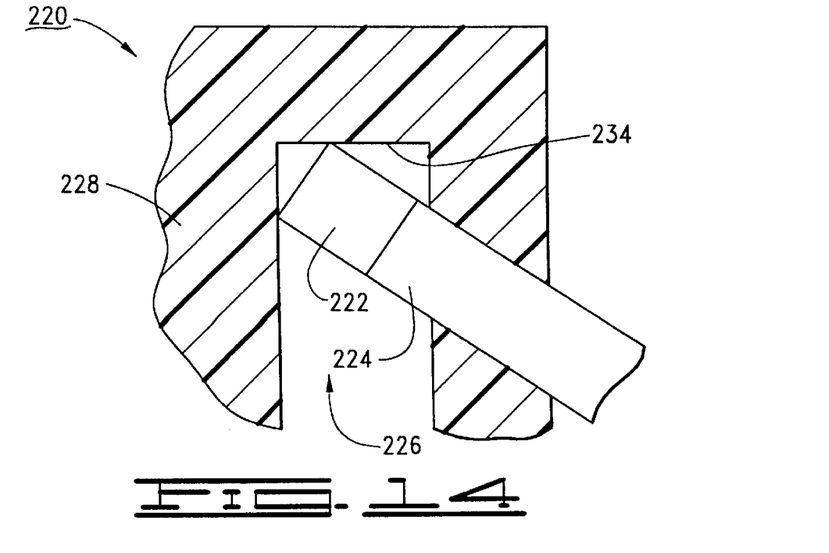
FIG. 14 provides an elevational, partial cross-sectional view of FIG. 13 in greater detail, showing the retention slot of the connector housing and one of the tabs of the distal end to illustrate how the distal end is captured in the connector housing.

FIG. 13 provides an elevational, partial cross-sectional view of the connector contact assembly 220 of FIG. 12, showing the cooperative relationship of the distal end 224 (with locking tabs 222) and the retention slot 226. For reference, additionally identified in FIG. 13 are a central flexure 230, a contact base 232 and the associated connector pin 150. FIG. 14 provides an elevational, partial cross-sectional view of FIG. 13, showing the retention slot 226 and the distal end 226 with one of the locking tabs 222. As can be readily seen in FIG. 14, a second surface 234 of the retention slot 226 serves to limit movement, and thereby capture, the distal end 226 of the connector contact assembly 220.

Figure 15:
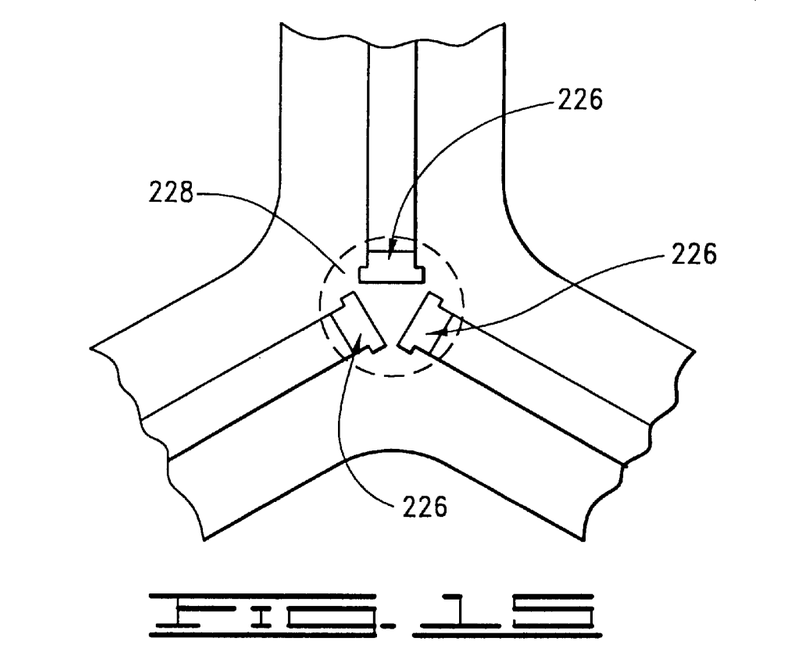
FIG. 15 provides a bottom plan view of a portion of a spindle motor connector assembly, similar to the view of FIG. 4, illustrating the retention slots in the connector housing. For clarity, the associated connector contact assembly of FIGS. 12–14 has been omitted from FIG. 15.

The retention slot 226 is formed so as to extend upwardly into the connector housing 228. For clarity, FIG. 15 provides a bottom plan view of a portion of a spindle motor connector assembly (not numerically designated), similar to the view of FIG. 4, illustrating the t-shaped retention slots 226 extending into the connector housing 228. It will be understood that the contact portion of the contact assembly 220 (comprising the distal end 224, the central flexure 230 and the contact base 232) has been omitted from FIG. 15.

Figure 16:
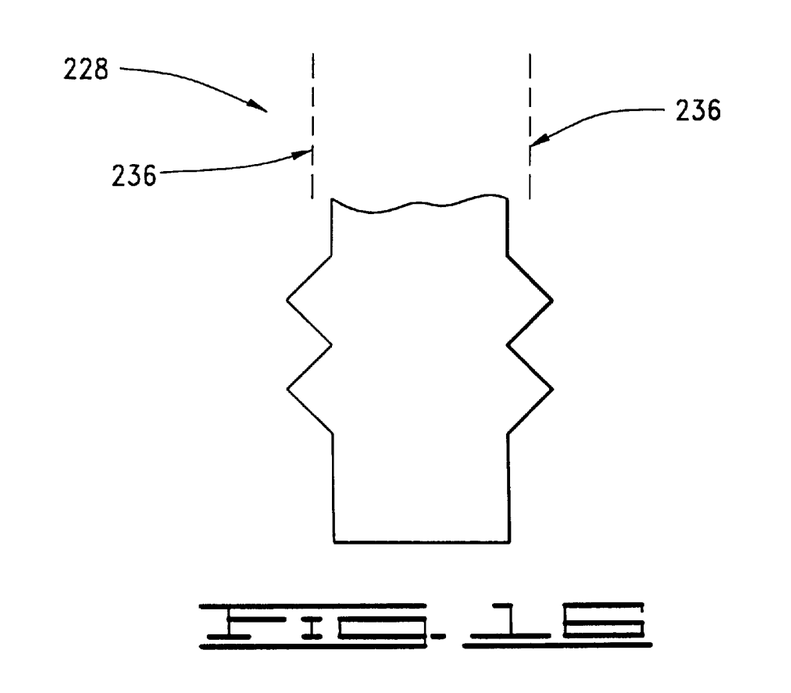
FIG. 16 provides a view of the barbs used to secure the distal end relative to the connector housing.

Thus, during assembly the distal end 224 (with the tabs 222) are inserted into the retention slot 226 from the bottom of the connector housing 228 and slid up until the distal end 224 contacts the second surface 234 of the retention slot 226. The distal end 232 is then secured in place against a first surface 236 (shown in broken line fashion in FIG. 16) of the retention slot 226 through an interference fit between the first surface 236 and barbs 238 extending from the contact base 232 (said barbs further shown back in FIG. 13). Accordingly, the contact base 232 and the distal end 224 are secured against the first and second surfaces 236, 234 so that insertion of the connector pin 150 causes deflection of the central flexure 230 toward the connector housing 228.

In view of the foregoing, it will be recognized that the present invention is directed to a connector contact assembly (such as 160, 220) for receiving insertion of a corresponding connector pin (such as 150) to establish an interconnected electrically conductive path. The connector contact assembly is suitable for use, for example, to provide drive current to a spindle motor (such as 104) of a disc drive (such as 100).

The connector contact assembly comprises a rigid, nonconductive housing (such as 154, 228) having a first surface (such as 170, 236) and a second surface (such as 171, 234). The contact comprises a contact base (such as 172, 232) which is rigidly secured to the first surface, a central flexure (such as 174, 230) which extends from the contact base along a curvilinear path apart from the first surface, and a distal end (such as 176, 224) which is adjacent the second surface, with the second surface limiting movement of the distal end in a direction parallel to the pin insertion axis (such as along 180). Hence, the first and second surfaces capture the contact base and the distal end, respectively, as the connector pin contacts and deflects the central flexure.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A connector contact assembly for establishing an electrical interconnection with a corresponding connector pin insertable along a pin insertion axis, comprising:
   an electrically nonconductive housing having first and second surfaces; and
   an electrically conductive contact having a contact base adjacent the first surface, a distal end adjacent the second surface and a central flexure connected to and extending along a curvilinear path between the contact base and the distal end, wherein insertion of the pin causes deflection of the central flexure toward the first surface, wherein the second surface limits movement of the distal end in a direction parallel to the pin insertion axis, and wherein the pin moves past the distal end before deflecting the central flexure.

2. The connector contact assembly of claim 1, wherein the second surface is substantially normal to the pin insertion axis.

3. The connector contact assembly of claim 1, wherein the curvilinear path comprises first, second and third curved sections, with the first and third curved sections maintaining a generally convex orientation with respect to the pin insertion axis and the second curved section maintaining a generally concave orientation with respect to the pin insertion axis.

4. The connector contact assembly of claim 3, wherein during insertion, the pin contacts and deflects the first curved section toward the first surface.

5. The connector contact assembly of claim 1, wherein during insertion, the pin contacts and deflects the central flexure toward the first surface.

6. The connector contact assembly of claim 1, wherein the contact base is connectable to an electrical lead extendable from the connector contact assembly so as place the electrical lead in series with the electrical interconnection.

7. The connector contact assembly of claim 1, wherein the distal end further comprises a tab which interlocks in a retention slot formed in the housing, the second surface composing a portion of the retention slot.

8. The connector contact assembly of claim 1, wherein the connector pin is part of a disc drive spindle motor so that current is supplied to the disc drive spindle motor through the connector contact assembly.

9. A connector contact assembly for establishing an electrical interconnection with a corresponding connector pin, comprising:
   a rigidly affixed contact base;
   a central flexure extending from the contact base along a curvilinear path substantially in a direction parallel to a pin insertion axis along which the pin is inserted, the central flexure characterized as a spring; and
   a rigidly affixed distal end, connected to the central flexure opposite the contact base, wherein insertion of the pin causes deflection of the central flexure and exertion of a contact force by the central flexure upon the connector pin while the contact base and the distal end remain rigidly affixed relative to the central flexure, the pin moving past the distal end before deflecting the central flexure.

10. The connector contact assembly of claim 9, wherein the central flexure comprises first, second and third curved sections, wherein the first and third curved sections maintaining a generally convex orientation with respect to the pin insertion axis and the second curved section maintaining a generally concave orientation with respect to the pin insertion axis.

11. A disc drive, comprising:

a spindle motor for rotating a magnetic storage disc, the spindle motor comprising a central, stationary shaft having a first end from which a plurality of connector pins extend; and a spindle motor connector comprising a plurality of connector contact assemblies, each connector contact assembly engaging a corresponding connector pin and comprising:

a rigid, nonconductive housing having a first surface substantially parallel to a pin insertion axis along which the connector pin is inserted and a second surface substantially normal to the first surface; and an electrically conductive contact which pressingly engages the connector pin when the connector pin is inserted, the contact comprising:

a contact base rigidly secured to the first surface;

a central flexure extending from the contact base along a curvilinear path apart from the first surface; and a distal end adjacent the second surface so that, when the connector pin is inserted past the distal end, the central flexure is deflected by the connector pin in a direction toward the first surface as the distal end is retained by pressingly engaging the second surface.

12. The disc drive of claim 11, further comprising:

a base deck on which the spindle motor is mounted, the first end of the central, stationary shaft of the spindle motor extending through an aperture in the base deck; and a printed wiring assembly housing control electronics for the disc drive mounted to the base deck opposite the spindle motor and adjacent the first end of the central, stationary shaft, wherein the spindle motor connector is rigidly secured to the printed wiring assembly.

* * * * *